(12) United States Patent
Berthier et al.

(10) Patent No.: US 10,521,586 B2
(45) Date of Patent: Dec. 31, 2019

(54) SECURED COMPARATIVE PROCESSING METHOD

(71) Applicant: Morpho, Issy-les-Moulineaux (FR)

(72) Inventors: Mael Berthier, Issy-les-Moulineaux (FR); Victor Servant, Issy-les-Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 614 days.

(21) Appl. No.: 15/107,879

(22) PCT Filed: Dec. 23, 2014

(86) PCT No.: PCT/FR2014/053546
§ 371 (c)(1),
(2) Date: Oct. 3, 2016

(87) PCT Pub. No.: WO2015/097413
PCT Pub. Date: Jul. 2, 2015

(65) Prior Publication Data
US 2017/0017790 A1    Jan. 19, 2017

(30) Foreign Application Priority Data
Dec. 24, 2013   (FR) ..................... 13 63557

(51) Int. Cl.
*G06F 11/30*      (2006.01)
*G06F 12/14*      (2006.01)
(Continued)

(52) U.S. Cl.
CPC ............ *G06F 21/558* (2013.01); *G06F 21/44* (2013.01); *G06F 21/552* (2013.01); *G06F 2221/034* (2013.01)

(58) Field of Classification Search
CPC ...... G06F 21/558; G06F 21/552; G06F 21/44; G06F 2221/034; G06F 21/755; H04L 9/003
See application file for complete search history.

(56) References Cited

U.S. PATENT DOCUMENTS 6,408,075 B1    6/2002   Ohki et al.
6,845,159 B1 *  1/2005   Domstedt ............. H04L 9/0618
                                                                380/264
(Continued)

FOREIGN PATENT DOCUMENTS

FR    2 847 402 A1    5/2004

OTHER PUBLICATIONS

Search Report in French Application No. 1363557 dated Oct. 10, 2014, with English translation coversheet. 10 pages.
(Continued)

*Primary Examiner* — Lynn D Feild
*Assistant Examiner* — Vadim Savenkov
(74) *Attorney, Agent, or Firm* — Womble Bond Dickinson (US) LLP

(57) ABSTRACT

The invention relates to a secured comparative processing method of the type in which a processor of an electronic component compares a set of proof data received by the processor as an input with main secret data stored in said electronic component, characterised in that the processor executes, in parallel with the comparison with the secret data, a series of complementary operations on the set of proof data which generate on the electronic component a variation in behaviour which is a function of the proof data which the component receives as an input and which is added to the variation in behaviour linked to the comparison with the main secret data, the series of complementary operations including a series of base operations repeated K (Continued)

times, and the execution of said series being preceded by an adjustment of execution parameters of said series, the parameters including: the identifier of the series of base operations to be executed, the series of base operations being comprised within a set of predefined base operations, and the number K of executions of the set of base operations, the set of adjusted execution parameters being specific to the set of proof data received by the electronic component.

9 Claims, 2 Drawing Sheets

(51) Int. Cl.
*G06F 21/55* (2013.01)
*G06F 21/44* (2013.01)

(56) References Cited

U.S. PATENT DOCUMENTS

| | | | | |
|---|---|---|---|---|
| 7,020,281 B2* | 3/2006 | Vadekar | ............ | G06F 7/725 341/55 |
| 7,188,259 B1* | 3/2007 | Romain | ............ | G06F 21/85 713/194 |
| 7,506,165 B2* | 3/2009 | Kocher | ............ | G06F 7/723 705/65 |
| 8,583,944 B1* | 11/2013 | Trimberger | ......... | G06F 11/3058 380/29 |
| 8,615,085 B2* | 12/2013 | Starr | ............ | H04L 9/003 380/259 |
| 8,832,462 B2* | 9/2014 | Trimberger | ............ | G06F 21/755 713/189 |
| 9,906,360 B2* | 2/2018 | Johnson | ............ | G06F 21/14 |
| 2008/0019503 A1* | 1/2008 | Dupaquis | ............ | H04L 9/0625 380/28 |
| 2009/0010424 A1* | 1/2009 | Qi | ............ | G06F 7/723 380/28 |
| 2012/0008767 A1* | 1/2012 | Smith | ............ | H04L 9/0631 380/28 |
| 2012/0278345 A1* | 11/2012 | Alexander | ............ | H04L 9/0656 707/756 |
| 2013/0301826 A1* | 11/2013 | Gueron | ............ | H04L 9/002 380/28 |
| 2014/0115405 A1* | 4/2014 | Condorelli | ............ | G06F 21/556 714/47.1 |
| 2014/0351603 A1* | 11/2014 | Feix | ............ | H04L 9/003 713/189 |

OTHER PUBLICATIONS

Search Report and Written Opinion of the ISA in PCT/FR2014/053546 dated Apr. 13, 2015, with English translation coversheet. 13 pages.

Plos et al. "Evaluation of Side-Channel Preprocessing Techniques on Cryptographic-Enabled HF and UHF RFID-Tag Prototypes." Workshop on RFID Security 2008 (Jul. 11, 2008). 14 pages.

Chevallier-Mames et al. "Low-Cost Solutions for Preventing Simple Side-Channel Analysis: Side-Channel Atomicity." Int. Assoc. for Cryptologic Research, vol. 20031112:162251 (Nov. 12, 2003). pp. 1-16. 16 pages.

\* cited by examiner

SECURED COMPARATIVE PROCESSING METHOD

FIELD OF THE INVENTION

The present invention relates to secure comparative processing methods.

It applies in particular advantageously to securing of comparison processing which can be performed on a smart card: authentication of PIN code for example, or verifications of certificates.

PRIOR ART

Many electronic components carry out comparison operations between secret data and data to be submitted to comparison, called hereinbelow "test data". These comparison operations can form the object of attacks to determiner said secret data.

Some of these attacks, called "side channels", consist of studying the behavior of the component (for example a smart card), especially in terms of electromagnetic leaks, or even in terms of variations in power consumption, or response time.

In fact if, during comparison between a secret value and a test value, the test value corresponds to the secret value, the component will execute different operations of other cases (triggering of a determined program, etc.).

So, in analyzing some operating parameters of the component during successive comparisons it is possible to show differences in behavior when the submitted test data correspond to the secret data and recover the secret data. Various solutions have been developed to stave off this type of attack.

These solutions comprise for example implementation of programs so-called "symmetrical" such as that proposed in application FR2813468. Such symmetrical programs aim to perform similar operations in case of correspondence or not between the compared data example so that the power consumption profiles of the system are identical.

Such solutions based on symmetrical programs do have the disadvantage of being very difficult to carry out. In fact, even if a symmetrical program were to minimize, or even eliminate, differences in behavior of the comparison operation per se, the success of the comparison necessarily involves a difference in subsequent processing relative to failure of this comparison.

Another solution has been to generate random execution periods, in the programs executed during comparison or thereafter, in case of failure as also in case of success. Apart from the imposition necessarily caused by these periods, this solution further has the disadvantage of being easily detectable by an attacker. During unsuccessful comparisons carried out, the latter can note the absence of particular signature of false identifiers (i.e., secret data separate from control secret data).

PRESENTATION OF THE INVENTION

Consequently, the aim of the invention is to propose a secure authentication method more resistant to "side channel" attacks than secure methods of the prior art, and not having the disadvantages mentioned hereinabove.

In this respect, a secure comparative processing method is proposed of the type in which a processor of an electronic component compares a set of test data which it receives at input to main secret data stored in said electronic component, characterized in that the processor executes in parallel to comparison to the secret data a series of complementary operations on the set of test data which generate on the electronic component a variation in behavior which is a function of the test data which it receives at input and which is added to the variation in behavior linked to comparison to the main secret data, the series of complementary operations comprising a basic operation repeated K times, and the execution of said series being preceded by adjustment of execution parameters of said series, the parameters comprising: the identifier of the sequence of basic operations to be executed, the sequence of basic operations being contained in a set of predefined basic operations, and the number K of executions of the sequence of basic operations, the set of adjusted execution parameters being specific to the set of test data received by the electronic component.

It is evident in this way that electromagnetic leaks, variations in current, etc. which can be marked by an external observer are linked to the:

common operations which will be similar for all submitted values;

noises which will be different irrespective of the comparison even using the same value;

secret data (if the submitted value corresponds to the secret);

test data (variation in behavior linked to the latter).

Therefore, after denoising, the leak or the variation in total consumption is the sum of a common component, a component linked to comparison with the secret data and a component linked to the complementary operations, which is a function of the test data.

It is impossible for an external observer to distinguish in the variation in behavior of the component that which corresponds to comparison to the secret data and that which corresponds to the complementary operations, which is a function of the test data.

The invention also relates to an electronic authentication component comprising a memory in which main control secret data are stored, and a processor, the electronic component being characterized in that the processor is adapted to execute the proposed method.

DESCRIPTION OF THE FIGURES

Other characteristics, aims and advantages of the present invention will emerge from the following detailed description with respect to the appended figures given by way of non-limiting examples and in which.

DETAILED DESCRIPTION OF EXEMPLARY EMBODIMENTS

Other applications of secure comparative processing, which are of course possible, are evident hereinbelow in the text, within the purely illustrative scope of an authentication method of PIN codes.

Figure 1:
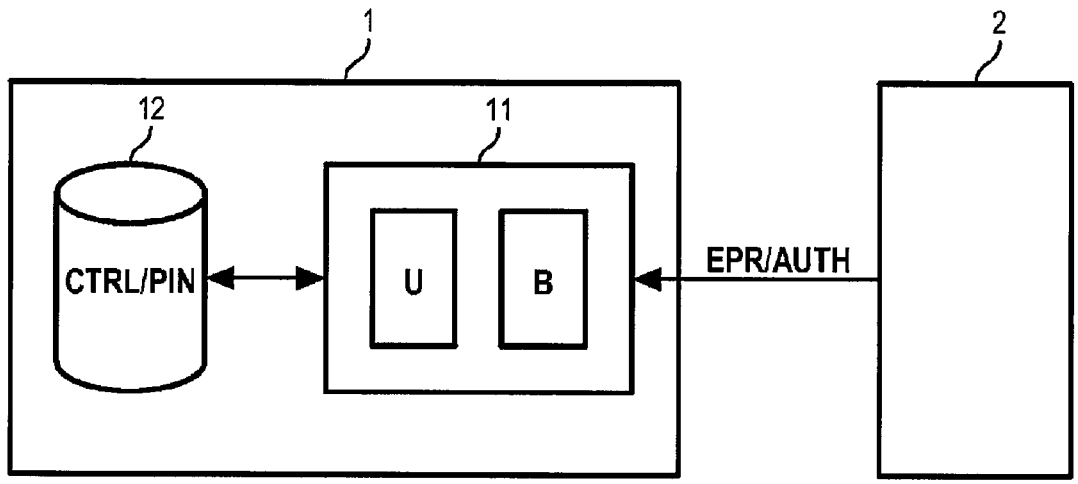
FIG. 1 schematically represents an example of secure electronic authentication component and exchanges of information with an authentication terminal.

In reference to FIG. 1, this shows an electronic authentication component 1 for performing authentication by comparison between a set of control secret data CTRL and a set of test data EPR, these data being for example authentication data AUTH. These data are for example encrypted codes.

This component 1 comprises electronics for performing this comparison, for example a processor 11 adapted to communicate with a memory 12, in which the control secret data PIN are stored. The component 1 is for example of smart card type.

The component 1 is further capable of dialoguing with a terminal 2, this terminal being an acquisition interface of the test data EPR to be compared to the set of control secret data CTRL.

As is known, the terminal 2 is configured to carry out acquisition of a set of test data, such as authentication data AUTH, to be compared to the set of control secret data CTRL. By way of non-limiting example, an individual can compose a code corresponding to the authentication data AUTH, for comparison with a PIN code.

The terminal 2 is also configured to then communicate to the processor 11 the test data EPR so that the processor compares said test data to the control secret data CTRL.

The memory 12 of the component 1 stores a useful processing program U executable by the processor 11.

In the case of an authentication method, the correspondence between the set of secret data and the set of test data ensures authentication of the individual and initiates execution by the processor 11 of the useful processing program U. This correspondence authorizes access of the individual to a dedicated service, which may be a smart card, by way of non-limiting example, a payment service, or access to a telephony service, etc.

The memory 12 of the component 1 also stores a scrambling program B executable by the processor 11, hereinbelow also called more simply "scrambler" B.

The scrambler B is more particularly configured to perform a series of complementary operations intended, as will be seen hereinbelow, to mask execution or non-execution of the program U according to the result of the comparison.

The execution of the series of complementary operations of the scrambler B is controlled by a set of execution parameters.

A given series of complementary operations executed depends on the last set of test data received by the component 1. It is understood that corresponding to each set of test data likely to be acquired by the terminal 2 is a separate adjustment of the execution parameters, and therefore specific execution of the series of complementary operations in particular soliciting the processor 11.

The scrambling program B is configured to execute via the processor 11 sequences of predefined operations, so-called "basic" operations. Each of these sequences of basic operations can typically be implemented in the form of a code function of the specific scrambling program B which corresponds to a respective set of instructions of the processor 11.

The sequences of basic operations can be very simple (copy, affectation, etc.) or else execute more complex instructions of the processor 11. It is supposed simply that each set of predefined basic operations requests the processor 11 separately in terms of calculation burden and/or calculation time, and that it causes a power consumption surplus by the component 1.

In an embodiment detailed below, there are three execution parameters.

A first execution parameter of the program B is an identifier O of a sequence of basic operations to be executed of all those available. The first execution parameter can for example be an index for determining, in a table of addresses, the execution address of the code function corresponding to the sequence of basic operations to be executed.

A second execution parameter of the program B is an integer K defining a number of executions of the sequence of basic operations (identified by the first execution parameter) to be executed by the processor 11.

The series of operations comprises a loop with K iterations, each iteration being the sequence of basic operations defined by the first execution parameter O.

A third execution parameter of the program B can be a wait period T between the instant of execution of each iteration of the loop consisting of the sequence of basic operations repeated K times.

For example, in the case of a four-digit PIN code, comprised between 0 and 9, 10,000 sets of different test data are likely to be received by the component 1; 10,000 different triplets of execution parameters must therefore correspond to these 10,000 sets of test data.

Authentication Method

Figure 2:
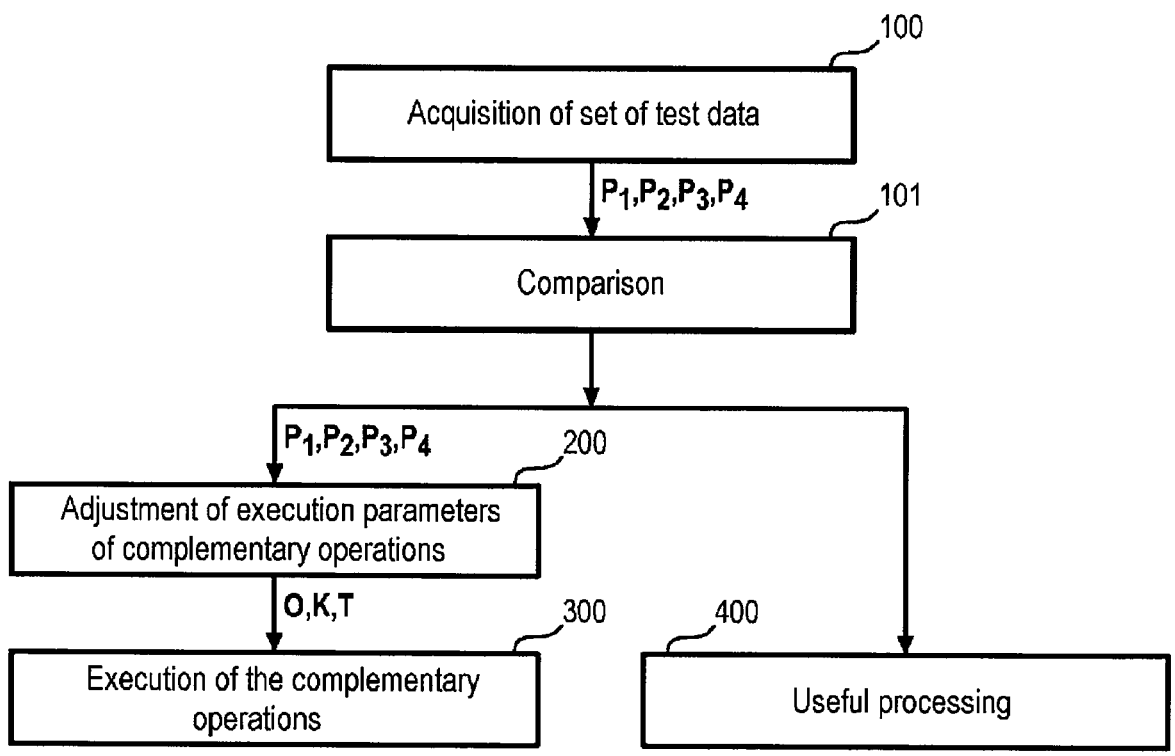
FIG. 2 represents the main steps of an example of execution of the method according to an embodiment of the invention.

FIG. 2 shows the main steps of the method according to the invention. The first step 100, as above, is acquisition by the processor 11 of a set of test data EPR via acquisition and transmission by the terminal 2.

The set of test data EPR is typically constituted by (or at least represented) by M values acquired by the terminal 2. In the particular case of authentication by PIN code, a case used as an example hereinbelow, the M values can be four integers between 0 and 9, respectively P1, P2, P3 and P4.

The processor 11 then compares the test data EPR to the control secret data CTRL and performs a comparison operation 101 on the control secret data CTRL.

In case of correspondence between the control secret data CTRL and the test data EPR, the processor executes the useful processing program U corresponding to success of the comparison 101. The operations performed by the program U (authentication, for example) are referenced 400.

At the same time as or following this comparison 101 or this authentication 400 the processor 11 executes the following steps by means of the scrambling program B. In an adjustment step 200, the processor 11 adjusts from the set of received test data EPR, here constituted by the quadruplet (P1, P2, P3, P4), the three execution parameters described earlier: the identifier of the sequence of basic operations to be executed, the number K of executions of this sequence, and the period T between two successive executions of the sequence of basic operations among the K executions provided.

In an execution step 300, the processor 11 executes the series of complementary operations according to the execution parameters determined during the adjustment step 200.

The adjustment 200 and execution 300 steps can be repeated after each comparison 101 made for a new set of test data acquired by the terminal 2.

Adjustment of the Execution Parameters

Figure 3:
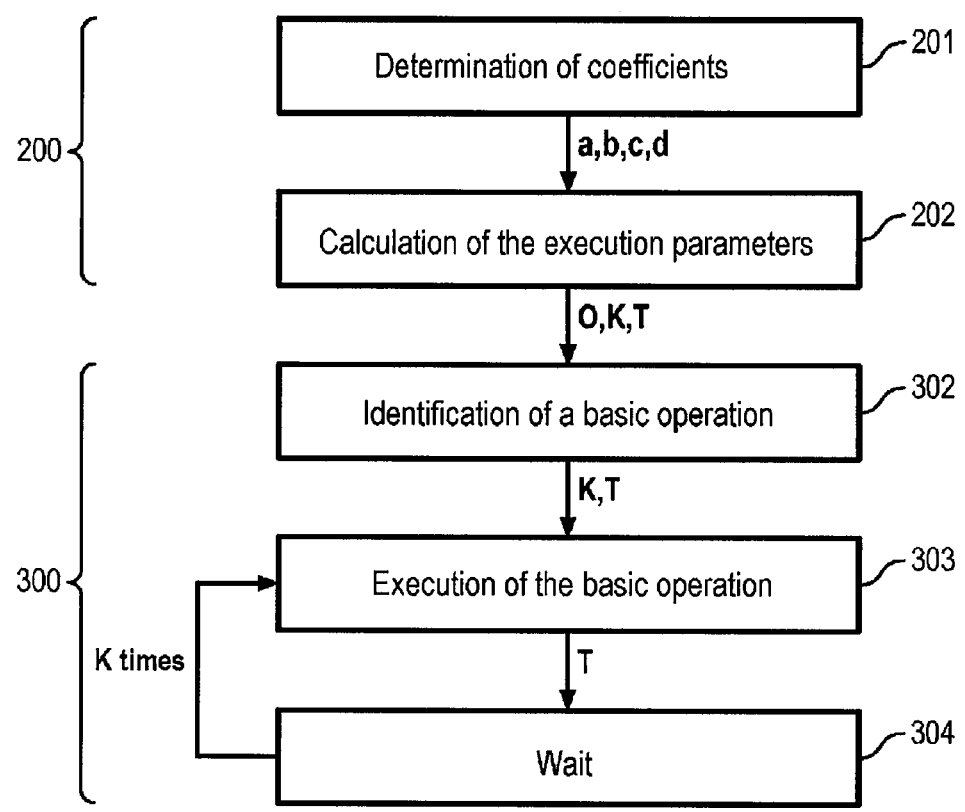
FIG. 3 details some steps already shown in FIG. 2.

In reference to FIG. 3, the adjustment step 200 of the execution parameters comprises calculation 202 of the execution parameters O, K, T by performing three functions of the scrambling program B: a function F1 taking at input the pair of values (P1, P2) and producing a first of the three execution parameters, a function F2 taking at input the value P3 and producing a second of the three execution parameters, and a function F3 taking at input P4 and producing the third and final execution parameter.

The triplet of functions F1, F2, F3 is selected so as to ensure the uniqueness of the triplet (O, K, T) of execution parameters obtained from the quadruplet of values P1 to P4.

The first execution parameter is any: it can be the identifier O of the sequence of basic operations, the number K, or else the period T.

The three execution parameters O, K, T can be for example produced by means of the following three functions F1, F2 and F3:

$$F1(P1, P2)=aP1+bP2$$

$$F2(P3)=cP3$$

$$F3(P4)=dP4$$

where a, b, c and d are predetermined coefficients.

A first practical embodiment of functions F1, F2 and F3 can be the following:

$$T=10*P1+P2$$

$$K=P3$$

$$O=P4$$

A second practical embodiment of functions F1, F2 and F3 can be the following:

$$K=11*P1+2*P2$$

$$T=P3$$

$$O=P4$$

The coefficients a, b, c, d can be variable values determined during a step 201 preceding the calculation step 202. The coefficients a and b could advantageously be selected as integers, one of which at least is greater than 10 such that a and b are prime to one another, ensuring the injectivity of the function F1 without this function being complex to implement.

Each of the coefficients a, b, c and d can be associated with a table stored in the memory 12 or directly in the code of the program B. Each table consigns selectable values for the corresponding coefficient.

The program B proceeds during the step 202 with circular reading of the four tables of coefficients to determine the coefficients a, b, c, and d with using during execution of the functions F1, F2 and F3: for each new set of test data received by the component 1, the program B reads in a new value of the table of coefficient (for example, the, index value immediately greater than the index of the final value read in the table). After the program B has read the final value of one of the tables of coefficients, the program B rereads the first value of this table. As a variant, the table can be browsed in reading by decreasing order of index.

The four tables of coefficients are preferably of different lengths (in number of coefficients) so as to avoid overly frequent repetition of a quadruplet of values a, b, c, d, and therefore increase the variability of performed operations. The lengths of the tables can also be selected prime to one another to minimize the frequency of such repetitions.

Carrying out functions F1, F2 and F3 therefore produces the three execution parameters which are the basic operation identifier O, the number K and the period T defined previously.

Execution of the Series of Complementary Operations

The processor then proceeds with execution 300 of the complementary operations by means of the scrambling program B, the step 300 comprising the following sub-steps taken once the parameters O, K and T have been adjusted.

The processor 11 identifies 302 an execution address of the sequence of basic operations identified by the identifier O. This address can be typically determined by inspection of a pointer array of functions each corresponding to an available sequence of basic operations, the table being onboard in the code of the scrambler B, the identifier being used as reading index in the pointer array.

The processor 11 then executes 303 the sequence of basic operations identified by the identifier O for a first time.

In a waiting sub-step 304, the processor 11 waits for a period equal to T before executing 303 for a second time the sequence of basic operations. This step is typically taken by starting up a timer configured with a period of expiration equal to the period T. On expiration of the timer (at the end of the period T) an interruption procedure is triggered which launches the following execution of step 303.

It will preferably be ensured that the period T is not of disproportionate length relative to the execution period of the series of additional operations to avoid performance restrictions.

Execution of the series of complementary operations generates a variation in behavior of the processor 11, and therefore more generally of the component 1, this variation in behavior adding to the variation in behavior linked to comparison to the main secret data (CTRL, PIN).

So, an outside observer can't distinguish the behavior of the component 1 according to whether there is or not success of the comparison 101.

Also, since the triplet of parameters (O, K, T) of the execution 300 of the series of complementary operations is specific to each quadruplet of values P1-P4 consisting of a set of test data, the external behavior of the component 1 is modified, even if this is not authentication or success of comparison between the test data and the control data.

In this way, an attacker who might observe the power consumption of the component 1 during the comparison step could consider that the particular current consumption profile of the component 1 comes from a program executed in case of authentication. He would therefore deduce that the entered test data EPR correspond to the control secret data CTRL and would be caused in error.

An authentication method for easy execution has therefore been developed, securer than methods previously developed, and particularly less expensive in calculation time than the prior art.

The steps described hereinabove can be repeated each time a new set of test data is received by the electronic component 1.

It is evident in particular that the wait step 304 can be conducted between the final execution of a first sequence of basic operations for a preceding comparison, and the first execution of a second sequence of basic operations for a current comparison.

Alternative Embodiments

The method according to the invention is not limited to the embodiments described previously.

The coefficients a, b, c, d can be fixed values for each comparison made by the electronic component 1, or else some of them.

The method can be generalized to values consisting of a set of test data P1 to P4 which are comprised between 0 and L; the parameters a and b could be integers greater than L+1 such that a and b are prime to one another.

The method can be generalized to sets of test data consisting of M values P1 to PM, and to a number of execution parameters as a number N less than M. Each execution parameter (of index i) is calculated as the image, by an injective function Fi, of one or more values associated with said parameter among the M values.

The invention claimed is:

1. A secure comparative processing method of the type in which a processor of an electronic component compares test data received by the electronic component to secret data stored in said electronic component, wherein the processor executes in parallel to said comparison, a series of complementary operations on the test data, which series of complementary operations produce a variation of physical or material properties of the electrical component, wherein said variation is a function of the test data and is added to a variation in behavior of physical or material properties of the electrical component linked to said comparison, the executed series of complementary operations comprising a sequence of basic operations repeated K times, and the execution of said series being preceded by adjustment of a tuple of execution parameters of said series according to the test data, the tuple of execution parameters comprising:
- an identifier of the sequence of basic operations, the sequence of basic operations being contained in a set of predefined basic operations,
- wherein there is a one-to-one correspondence between each value of the tuple of execution parameters and each value of the test data received by the electronic component, said one-to-one correspondence used to make the electronic component more resistant to side channel attacks.

2. The method according to claim 1, wherein the tuple of execution parameters also comprises a wait period between two successive executions of the basic operation.

3. The method according to claim 2, wherein the test data comprises M values, and the tuple of execution parameters is a N-tuple, wherein N<M, each execution parameter being calculated as an image, by a respective injective function, of one or more values associated with said execution parameter among the M values.

4. The method according to claim 3, wherein the M values are first, second, third and fourth integer values each between 0 and L, wherein N=3, and:
- a first of the execution parameters is equal to $$aP1+bP2,$$

where a and b are two first integer coefficients one of which at least is greater than L+1 such that a and b are prime to one another,

- a second of the execution parameters is equal to the third value multiplied by a second predetermined coefficient, and
- the third of the execution parameters is equal to the fourth value multiplied by a third predetermined coefficient.

5. The method according to claim 4, wherein at least one of the coefficients varies with each new test data received by the electronic component.

6. The method according to claim 5, wherein each variable coefficient is selected by circular reading of an associated table of coefficients and stored in the electronic component, the tables being of different lengths.

7. An authentication method wherein a comparative processing method according to claim 1 is performed, the received test data being codes to be authenticated.

8. An electronic authentication component comprising a memory in which main control secret data are stored, and a processor, the electronic component being characterized in that the processor is programmed to execute the method according to claim 1.

9. A secure comparative processing method performed by a processor of an electronic component, wherein the method comprises:
- receiving test data,
- adjusting a tuple of execution parameters according to the test data, the tuple of execution parameters comprising a number K and an identifier of a sequence of basic operations contained in a set of predefined basic operations, wherein there is a one-to-one correspondence between each value of the adjusted tuple of execution parameters and each value of the test data,
- comparing the test data to secret data stored in said electronic component, to cause a first variation of physical or material properties of the electrical component,
- in parallel to said comparing, executing K times a sequence of basic operation having said identifier, to cause a second variation of physical or material properties of the electrical component which is added to said first variation and depends on the test data, said one-to-one correspondence used to make the electronic component more resistant to side channel attacks.

* * * * *